United States Patent
Bosneag

(10) Patent No.: US 8,199,674 B2
(45) Date of Patent: Jun. 12, 2012

(54) SYSTEM, METHOD AND NETWORK NODE FOR CHECKING THE CONSISTENCY OF NODE RELATIONSHIP INFORMATION IN THE NODES OF A STRONGLY CONNECTED NETWORK

(75) Inventor: Anne-Marie Cristina Bosneag, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 17 days.

(21) Appl. No.: 12/528,321

(22) PCT Filed: Feb. 28, 2008

(86) PCT No.: PCT/EP2008/052419
§ 371 (c)(1),
(2), (4) Date: Nov. 8, 2010

(87) PCT Pub. No.: WO2008/110461
PCT Pub. Date: Sep. 18, 2008

(65) Prior Publication Data
US 2011/0051622 A1  Mar. 3, 2011

Related U.S. Application Data

(60) Provisional application No. 60/894,057, filed on Mar. 9, 2007.

(51) Int. Cl.
*H04L 12/28* (2006.01)
(52) U.S. Cl. .......................... 370/254; 710/316
(58) Field of Classification Search .................. 370/254, 370/389; 709/238
See application file for complete search history.

(56) References Cited

U.S. PATENT DOCUMENTS

| | | | |
|---|---|---|---|
| 6,067,573 A | 5/2000 | Tam et al. | |
| 2002/0161917 A1 * | 10/2002 | Shapiro et al. | 709/238 |
| 2003/0028668 A1 | 2/2003 | Garcia-Luna-Aceves et al. | |
| 2006/0256769 A1 | 11/2006 | Cho et al. | |
| 2007/0237139 A1 * | 10/2007 | Garcia-Martin et al. | 370/389 |

OTHER PUBLICATIONS

Thampi et al. "An Agent Based Peer-to-Peer Network with Thesaurus Based Searching, and Load Balancing"—2005.*
PCT International Search Report, mailed Jul. 31, 2008, in connection with International Application No. PCT/EP2008/052419.
ITU-T Recommendation M.3010, Series M: TMN and Network Maintenance: International Transmission Systems, Telephone Circuits, Telegraphy, Facsimile and Leased Circuits, Telecommunications management network. "Principles for a telecommunications management network" Geneva, Switzerland, Feb. 2000.

* cited by examiner

*Primary Examiner* — Dang Ton
*Assistant Examiner* — Lionel Preval
(74) *Attorney, Agent, or Firm* — Potomac Patent Group PLLC

(57) ABSTRACT

A system, method, and network node for checking the consistency of node relations in the nodes of a strongly connected network. An initiating network node initiates a request to check the consistency of node relations in the network. Each receiving node that receives the request determines whether defined relations received from the initiating node are symmetrically reflected by defined relations stored in the receiving network node. A local result is temporarily stored. The receiving node also identifies other nodes, if any, with which the receiving node has defined relations, and sends consistency-checking requests to the identified nodes. As responses are received from all of the identified nodes, the receiving network node aggregates the results with the stored local result and sends an aggregated response to the initiating node reporting the consistency or inconsistency of all of the receiving node's defined relations.

8 Claims, 4 Drawing Sheets

SYSTEM, METHOD AND NETWORK NODE FOR CHECKING THE CONSISTENCY OF NODE RELATIONSHIP INFORMATION IN THE NODES OF A STRONGLY CONNECTED NETWORK

CROSS-REFERENCE TO RELATED APPLICATIONS

This application claims the benefit of U.S. Provisional Application No. 60/894,057, filed Mar. 9, 2007, which is hereby incorporated herein by reference in its entirety.

TECHNICAL FIELD OF THE INVENTION

This invention relates to network management activities in communication networks. More particularly, and not by way of limitation, the invention is directed to a system and method for checking the consistency of node relationship information in a plurality of nodes in a strongly connected network.

DESCRIPTION OF RELATED ART

The management architecture in use today in communication networks are based on an architecture specified by the ITU-M series of standards. This seminal work in the field of network management had at its center the simple client-server architecture. In the standard text, this is referred to as the "agent-manager" relationship, where the Agent resides on the network equipment being managed and the Manager is a central entity that interacts with the agent for the retrieval of management information and coordination of configuration tasks. This is basically the same paradigm that current third generation (3G) Network Management System (NMS) solutions are based on. This architecture relies on a centralized element or server responsible for collecting data from managed devices, aggregating the data, and setting the state information on the device. The functionality realized in this server is typically divided according to the FCAPS functional taxonomy, as defined by ITU-T in the X.700 specification family.

A major task in existing telecom networks is maintaining data consistency with, and related to, the network nodes, their links, interconnections, and relationships. Of particular interest, is the case of data that refers to multiple network nodes, (for example, data defining relationships between the network nodes). Even though it is essential that the data be defined correctly on multiple network nodes, there is often no automatic mechanism in place to ensure that all of the relevant nodes have the same relationship information defined on each side of their node relationships. It is left to the centralized network manager to take the responsibility for identifying dependencies between different data and defining the relations correctly. Moreover, with the current centralized model for NMSs, in which the controlling (central) node creates a view of the network used for management tasks, there are additional inconsistencies introduced by virtue of the time taken to synchronize data in the network nodes with the view held at the network manager, or even loss of updates from the network nodes to the network manager caused by any one of a number of issues such as protocols, interfaces being used, or link failures.

Periodic checks of the consistency of data must therefore be performed on entire areas of the network in order to discover any incorrectly defined data. The purpose of these checks is to present to the network operator, at least the cases where network relations are asymmetrically defined and allow the network operator to decide whether the relations were defined asymmetrically on purpose, or whether this indicates a fault.

FIG. 1 is a simplified block diagram illustrating the relationship between a centralized management node 11 and a plurality of network nodes 12 in a traditional strongly connected network utilizing a centralized network management solution. At the physical layer, the nodes are connected by communication channels 13. The central management node copies all relationship data from the network nodes, aggregates and synchronizes the data as necessary in various data structures 16 according to some defined set of rules, creates a depiction or model (digraph DG) 14 of the logical links at the central management node, and then compares the relations defined.

This approach implies a large amount of data processing at one single node and therefore suffers in terms of scalability, efficiency, fault tolerance, and correctness of data being managed. These problems will become even more acute due to the current trend of networks evolution towards massively distributed systems characterized by very large size and increased complexity and dynamicity.

As shown in FIG. 1, the central management node 11 creates the digraph DG=(V, A) 14, which logically reflects the network nodes 12 and their relationships. The digraph illustrates logical connections such as handover relations, which are based on the relations defined between the different nodes in the physical layer. A set of vertices V is represented by those network nodes that are involved in at least one relation with other network nodes, while a set of arcs A contains the actual relations defined between the network nodes. The digraph represents the view of the central management node regarding the logical relations between the physical network nodes.

Checks for consistency of relations between the network nodes 12 are performed on the digraph 14 to assess the symmetry of relations (i.e., if a relation was defined from network node X to network node Y, then the same must be true from network node Y to network node X). This is equivalent to checking whether the arcs between two network nodes that have a relationship defined between them are bi-directional (for example, checking whether arc R 15 is bi-directional). An example of such a relation is the neighboring cell relation defined between cells on different network nodes for handover purposes in a cellular telecommunications network.

If the digraph 14 is strongly connected (i.e., there is a path between any two nodes in the graph), then point-to-point requests originating at the central management node will eventually be propagated to any addressed network node (presupposing some underlying layer which enables node discovery and addressing). However, if the digraph used for spreading the requests is not strongly connected, there can be no guarantee that requests which originate at the central management node will be, or can be, propagated to all interested nodes for the current task. This situation is even more likely to occur in the context of dynamic networks, where a faulty or temporarily disconnected node might break the paths in an initially strongly connected graph.

Several problems arise in a centralized solution. These include currency of the managing node's view of the network, scalability, performance, availability, fault tolerance, and consistency. Regarding scalability, current solutions have problems handling increases in the number of nodes being managed. The process of data collection, aggregation, and correlation becomes very complex as there is a commensurate increase in the volume of data to be managed relative to the number of devices/network elements which are to be managed. Regarding performance and availability, the 1-n (one manager to many agents) relationship in current solutions creates problems in case of failure of the central manager. The manager can be replicated, but this causes additional problems related to consistency of the data between the primary and backup manager. Similarly, the central manager can be overloaded collecting data from the nodes and processing the collected data. In more extreme cases, when a management task is related to an entire network, such as determining whether a property holds true across all nodes in the network where there is shared state information (cell parameters), this workload can be difficult to handle in an efficient manner at one central location.

Regarding fault tolerance, as the size of the digraph increases, the probability of faults introduced by incorrect definition of relationships and dependencies between network nodes increases. Finally, current solutions have problems maintaining consistency of data collected by the central management node. When working on a snapshot or copy of information retrieved from the network to support cell planning, for example, the central node performs all data processing on local copies of the actual data. Ensuring strict consistency between the data on the managed node and the data on the OSS node is extremely difficult or impossible in massively distributed systems.

The above issues raise serious and complicated challenges as networks evolve and the volume of entities to be managed grows ever larger. What is needed in the art is a system and method that helps alleviate the problems associated with the issues outlined above. The system and method should operate with a decentralized management architecture and should enable efficient checking of the consistency of node relationship information in a plurality of nodes in the network. The present invention provides such a system and method.

SUMMARY OF THE INVENTION

The present invention addresses these problems by distributing the network management applications and algorithms into the managed network and working on the data in the network nodes themselves (i.e., distributed data) as opposed to working with potentially inconsistent copies of data collected at a central network management node. This has several advantages, among which are distributing the load across the network nodes and using verifiably consistent data (i.e., actual data on the node as opposed to a copy on the management node). The invention thus allows for large growth in the number of network elements being managed, and handles the increased complexity and dynamics which result from distributing the management functions between the managing systems and the managed systems. Decentralizing the management tasks helps to alleviate the load on the managing system, to improve the efficiency of the management process, and to ensure that the data processing is performed on the actual data.

In one embodiment, the present invention is directed to a method of checking the consistency of node relationship information in the nodes of a strongly connected network. A receiving network node receives from an initiating network node, a consistency-checking request which requests the receiving node to check the consistency of node relationship information between the initiating node and the receiving node. The receiving node determines a local consistency-checking result by comparing relationship information stored in the receiving node with relationship information received in the request. If the receiving node does not have defined relations with any other nodes, the receiving node sends the local consistency-checking result to the initiating network node. If the receiving node has defined relations with at least one other node, the receiving node performs the steps of sending a further consistency-checking request to at least one other node with which the receiving network node has a defined relationship; receiving from the at least one other node, a consistency-checking response which includes a further consistency-checking result regarding the consistency of relationship information between the receiving node and the at least one other node; aggregating the further consistency-checking result with the local consistency-checking result to form an aggregated result; and sending the aggregated result to the initiating network node.

In another embodiment, the present invention is directed to a method of checking the consistency of node relationship information in a plurality of nodes in a strongly connected network. The method includes the steps of receiving in a first network node, a request sent from a second network node, the request including node relationship information from the second network node and requesting the first network node to check node relationship information stored in the first node for consistency with the node relationship information received from the second network node. The method also includes determining whether the request received from the second network node is a duplicate request. If so, or if the first network node does not have defined relations with any further nodes in the network, the first network node determines a local consistency-checking result by comparing the first network node's node relationship information and the second network node's node relationship information, and sends the local consistency-checking result to the second node. However, if the request received from the second network node is not a duplicate request and the first network node has defined relations with at least one further node in the network, the method includes temporarily storing the local consistency-checking result in the first network node; identifying at least one other network node with which the first network node has a defined relationship; and sending a second request to the at least one other network node. The second request includes node relationship information from the first network node relative to the at least one other network node, and requests the at least one other network node to check node relationship information stored therein for consistency with the node relationship information received from the first network node. The method also includes receiving from the at least one other network node, a result of a comparison of the at least one other network node's node relationship information and the first network node's node relationship information; aggregating the result received from the at least one other network node with the temporarily stored result to create an aggregated result; and sending the aggregated result to the second network node.

In another embodiment, the present invention is directed to a system for checking the consistency of node relationship information in the nodes of a strongly connected network. The system includes an initiating network node for initiating a request to check the consistency of node relationship information; and at least one receiving network node that receives the request. Each receiving node includes means for determining whether defined relationship information received from the initiating network node is symmetrically reflected by defined relationship information stored in the receiving network node; and means for determining whether the receiving network node has defined relations with any further nodes in the network. If the receiving network node does not have defined relations with any further nodes in the network, the receiving node includes means for sending a response to the initiating node reporting whether the relationship information received from the initiating node is symmetrically reflected by relationship information stored in the receiving network node. If the receiving network node has defined relations with at least one further node in the network, the receiving node includes means for sending a request to each further node to report whether defined relationship information stored in the further node symmetrically reflects defined relationship information included in the request from the receiving node, and for sending an aggregated response to the initiating network node reporting the consistency or inconsistency of all of the receiving network node's defined relationship information.

In another embodiment, the present invention is directed to a network node for checking the consistency of node relationship information stored in the network node and other network nodes in a strongly connected network. The network node includes means for receiving from an initiating node, a request to check the consistency of node relationship information; means for determining whether relationship information received from the initiating node is symmetrically reflected by relationship information stored in the network node; and means for determining whether the network node has defined relations with any further nodes in the network. If the network node does not have defined relations with any further nodes in the network, the network node includes means for sending a response to the initiating node reporting whether the relationship information received from the initiating node is symmetrically reflected by relationship information stored in the network node. If the network node has defined relations with at least one further node in the network, the network node includes means for sending a request to each further node to report whether defined relationship information stored in the further node symmetrically reflects defined relationship information included in the request from the network node, and for sending an aggregated response to the initiating network node reporting the consistency or inconsistency of all of the network node's defined relationship information.

BRIEF DESCRIPTION OF THE DRAWINGS

In the following, the essential features of the invention will be described in detail by showing preferred embodiments, with reference to the attached figures in which.

DETAILED DESCRIPTION OF EMBODIMENTS

The present invention provides a new distributed method for checking the consistency (i.e., symmetry) of the relationships defined between network nodes. The invention distributes a consistency-checking procedure to all the network nodes that have, or may be expected to have, such relationships defined.

Each network node is responsible for identifying the set of network nodes that it has defined relationships with and for requesting them to determine whether the node's defined relations are correctly reflected at each neighboring node. The neighboring nodes then further propagate the request to their own neighbors, and check the consistency of those relations. Results from downstream neighbors are aggregated at each node along the route, and are sent back in an aggregated result to the network node that prompted the initial check. This distributed approach leads to improved scalability, efficiency and fault tolerance, because the load is distributed among all the network nodes involved.

Figure 1:
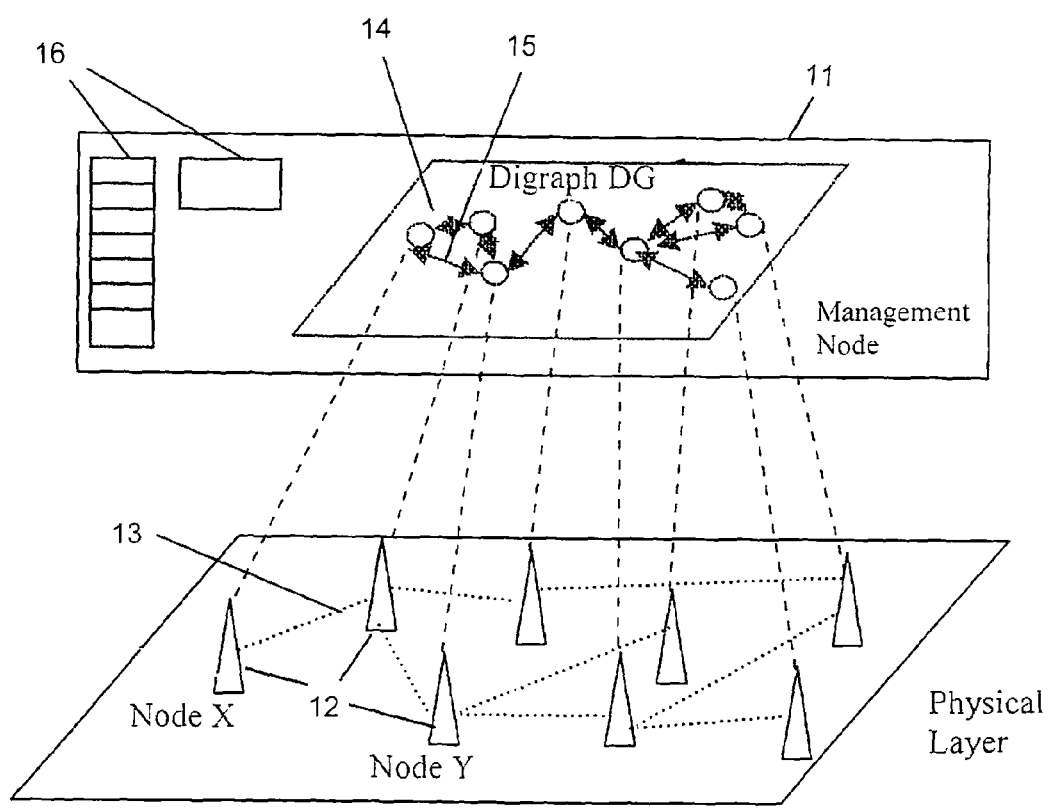
FIG. 1 (Prior Art) is a simplified block diagram illustrating the relationship between a centralized management node and a plurality of network nodes in a traditional strongly connected network utilizing a centralized network management solution.
Figure 2:
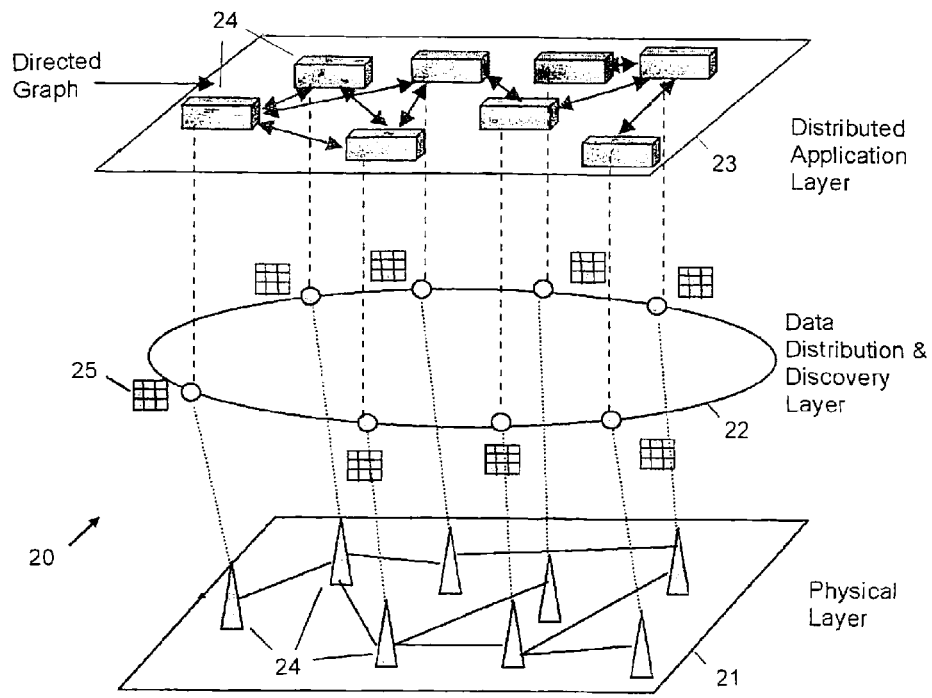
FIG. 2 is a simplified block diagram of a network architecture suitable for implementing the present invention.

FIG. 2 is a simplified block diagram of a network architecture 20 suitable for implementing the present invention. In general, the architecture comprises three distinct layers: a physical layer 21, a Data Discovery and Distribution ($D^3$) layer 22, and a distributed application layer 23. The physical layer 21 provides synchronous and asynchronous communication between network nodes 24. The communications may be wired or wireless, and may include any one of a number of technologies including, but not restricted to, ATM, Ethernet, TCP/IP, and the like. The $D^3$ layer 22 supports the application layer 23 and provides an indexing capability through an automatically reconfigurable peer-to-peer node discovery layer. The $D^3$ layer may be referred to herein as the overlay network. The application layer provides the basis on which network management tasks are built. The application layer organizes the network nodes into a directed graph based on application-level relations between the nodes. This graph, in turn, defines how the network nodes may collaborate with each other for network management task completion.

In brief, the application-level graph may be viewed as being used to propagate the request, the $D^3$ layer as being used to locate and address nodes, and the physical layer as being used for the actual data communication.

In the present invention, the relations graph DG is distributed throughout the network rather than being formulated in a centralized management node. Each network node stores the portion of the graph related to its own set of relations, i.e., the set of relations defined for itself. From a logical point of view, although the data is stored throughout the network in a distributed fashion, the graph can be perceived as a logical overlay layer on top of the physical layer. The present invention propagates the consistency-checking requests from one node to another through the logical graph DG, without requiring the use of any central knowledge base (such as using the central network management node as an intermediary that re-directs all requests). In the preferred embodiment, the present invention is implemented in a network in which the graph DG is strongly connected (i.e., there is a path between any two nodes in the graph DG). Therefore, the consistency-checking request can be initiated in (or an operator can send the request to) any node in the network, and the request will reach all other connected nodes.

In order to enable the distribution of consistency-checking requests, the architecture of the present invention allows for communication of requests not only between the managing system and managed system(s), but also between the managed system(s), when it is more appropriate to do so. This new architectural approach demands that managed systems must be able to locate and communicate with each other without necessarily using a centralized system as an intermediary.

For reliability reasons, automated routing around failures and automatic reconfiguration in the face of node arrival/ departure is extremely important in the context of networks spanning many thousands or even tens of thousands of managed systems. As noted, to enable distribution of consistency-checking requests, managed systems must be able to locate and address each other without the use of centralized knowledge. This discovery plane in turn should be scalable and reconfigurable, and logically integrated with the existing network structure, so as to be of maximum use to the management applications. In various embodiments of the present invention, the identifiers used in the discovery plane are logically related to unique semantic information currently defined and used in the managed network.

The $D^3$ functional overlay (abstraction) layer 22 supports effective control and management of network elements (managed systems) by providing a framework and architecture that supports dynamic discovery of the relevant information needed to support managing the traffic network in a distributed manner, and provides the infrastructure needed to support distributed management algorithms which can be used for the creation of an autonomic management system. The invention uses semantic information from the traffic network and network management tasks to build the $D^3$ layer and dynamically maintain the $D^3$ layer when the network configuration or the semantics change. Examples of suitable architectures are DHT-like implementations.

The $D^3$ layer 22 is a computational abstraction layer that sits on top of the traffic network and below the classic Network Management "Manager" layer. The $D^3$ layer is used to enable distributed discovery and addressing of nodes, necessary to support distributing the consistency-checking requests across the network elements. The primary objective of the $D^3$ layer is to enable nodes to autonomously locate each other and communicate directly, without the need, support, or central knowledge of a central node to forward requests.

The methodology described herein builds on existing concepts such as peer-to-peer systems. The goals of discovering distributed network nodes and management information, detecting inconsistent management information in the nodes, and distributing network management tasks to the nodes require some form of peer-to-peer architecture, which allows nodes to directly communicate with each other and collaborate together, so as to accomplish specific network management tasks. In peer-to-peer systems, each node has partial knowledge of the network, being therefore able to contact a subset of nodes in the system.

The exemplary embodiment described herein works in the context of a Network Management System (NMS) in which the $D^3$ layer 22 enables nodes to discover each other and communicate with each other in a distributed manner. The network nodes 24 propagate a consistency-checking request through the application plane using the graph of node relations.

At the $D^3$ layer 22, routing tables and/or neighborhood sets 25 are created according to a pre-defined algorithm, which enables distributed discovery of network nodes 24 and relationship data associated with the network nodes. When a request needs to be sent from one network node to another, the routing information in the overlay node (i.e., local information at the $D^3$ layer) is utilized to discover a route to the target node. In most embodiments in which the overlay is implemented utilizing DHT technology, or a variant thereof, the DHT implementations will guarantee the discovery of the destination node in an average of $O(\log N)$ steps, where N is number of nodes in the $D^3$ layer, for $O(\log N)$ information kept in the local routing tables.

The design of the network architecture 20 is based on the following principles:

(1) Network element boot strapping—this is the setup of the overlay network management network. This allows for the dynamic behavior of the overlay ($D^3$) layer 22 and thus facilitates the formation of the overlay network. The architecture utilizes an inventive process and mechanism for passing data between the traffic network and the overlay. As the node attaches to the managed network, semantically specified information or domain-specific encoding of index space is transferred (e.g., Fully Distinguished Name (FDN) of a Radio Network Controller (RNC) in a WCDMA Radio Access Network (WRAN)). This information enables application-level routing of network management requests.

(2) Overlay ($D^3$) network reconfigurability—this involves observing the overlay network and responding to requests from neighbors as the traffic network changes. This aspect refers to the need for reconfiguration of the routing tables over time to handle changes in the physical network—these routing tables contain a distributed index of management nodes and data. As network elements leave the traffic network (either as a planned activity or due to a fault or failure) and consequently leave the application network, the routing tables in the overlay layer must be reconfigured to account for the changes. Additionally, as the state or description of the nodes and/or management data changes, or if new nodes join the network, a new node is added to the overlay to reflect the changes.

(3) Message-based communication—this enables management information to be transferred between distributed entities.

Figure 3:
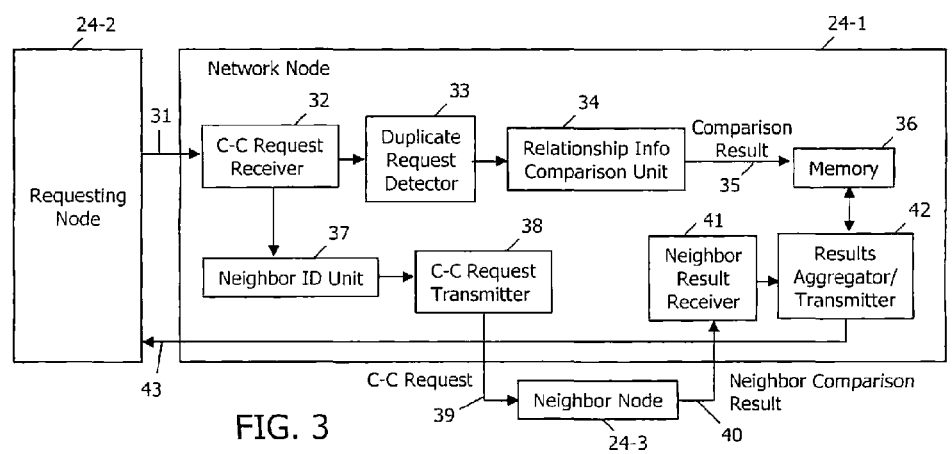
FIG. 3 is a simplified block diagram of a network node in an exemplary embodiment of the present invention.

FIG. 3 is a simplified block diagram of a network node 24-1 in an exemplary embodiment of the present invention. A requesting node 24-2 sends a consistency-checking (C-C) request 32 to the network node 24-1 where the request is received in a C-C request receiver 32. The C-C request includes relationship information from the requesting node relating to the relationship between the requesting node and the network node. If the request is addressed to a different destination node, the request is passed on to another node in the network, according to the local routing tables. If the request is addressed to this node, then the receiver passes the request to a duplicate request detector 33, which initiates a mechanism to determine whether the request is a duplicate which has already been processed, or is a request addressed to a different destination node. If the request is not a duplicate and contains information for the network node 24-1 to check, the relationship information is passed to a relationship information comparison unit 34, which compares the received information with relationship information stored in the network node. A comparison result 35 is then temporarily stored in a memory 36. The comparison result may identify inconsistent information, or may indicate that all relationship information is consistent.

The C-C request receiver 32 also initiates a process in a neighbor ID unit 37 to determine whether there are further neighboring nodes with which the network node 24-1 has a defined relationship, and to identify such nodes. If there are no such nodes, the network node sends a response to the requesting node 24-2 with the comparison result 35. If there are further neighboring nodes with which the network node 24-1 has a defined relationship, a C-C request transmitter 38 sends a C-C request 39 to any identified neighboring nodes 24-3. The C-C request 39 includes relationship information from the network node 24-1 relating to the relationship between the network node 24-1 and the further neighboring node(s) 24-3. The neighboring node(s) perform a comparison of the received information with relationship information stored in the neighboring node. The neighboring node(s) also request more remote nodes with which the neighboring nodes have defined relations to perform a comparison of information sent by the neighboring node(s) with relationship information stored in the more remote nodes. The neighboring node(s) aggregate the responses and send a neighbor comparison result 40 back to the network node 24-1 where the result is received in a neighbor result receiver 41. The comparison result may identify inconsistent information, or may indicate that all relationship information is consistent. The neighbor comparison result is sent to a results aggregator/transmitter 42, which retrieves the network node's comparison result 35 from the memory 36, and aggregates the results into an aggregated result 43. The aggregator/transmitter then sends the aggregated result to the requesting node 24-2.

If the C-C request 31 is a duplicate, network node 24-1 checks the consistency of its relationship information with node 24-2 and sends a response to node 24-2, so that node 24-2 does not time out waiting for a response. However, network node 24-1 does not forward the request further to neighboring node 24-3, since this check has been performed during the processing of the previously received request.

Figure 4:
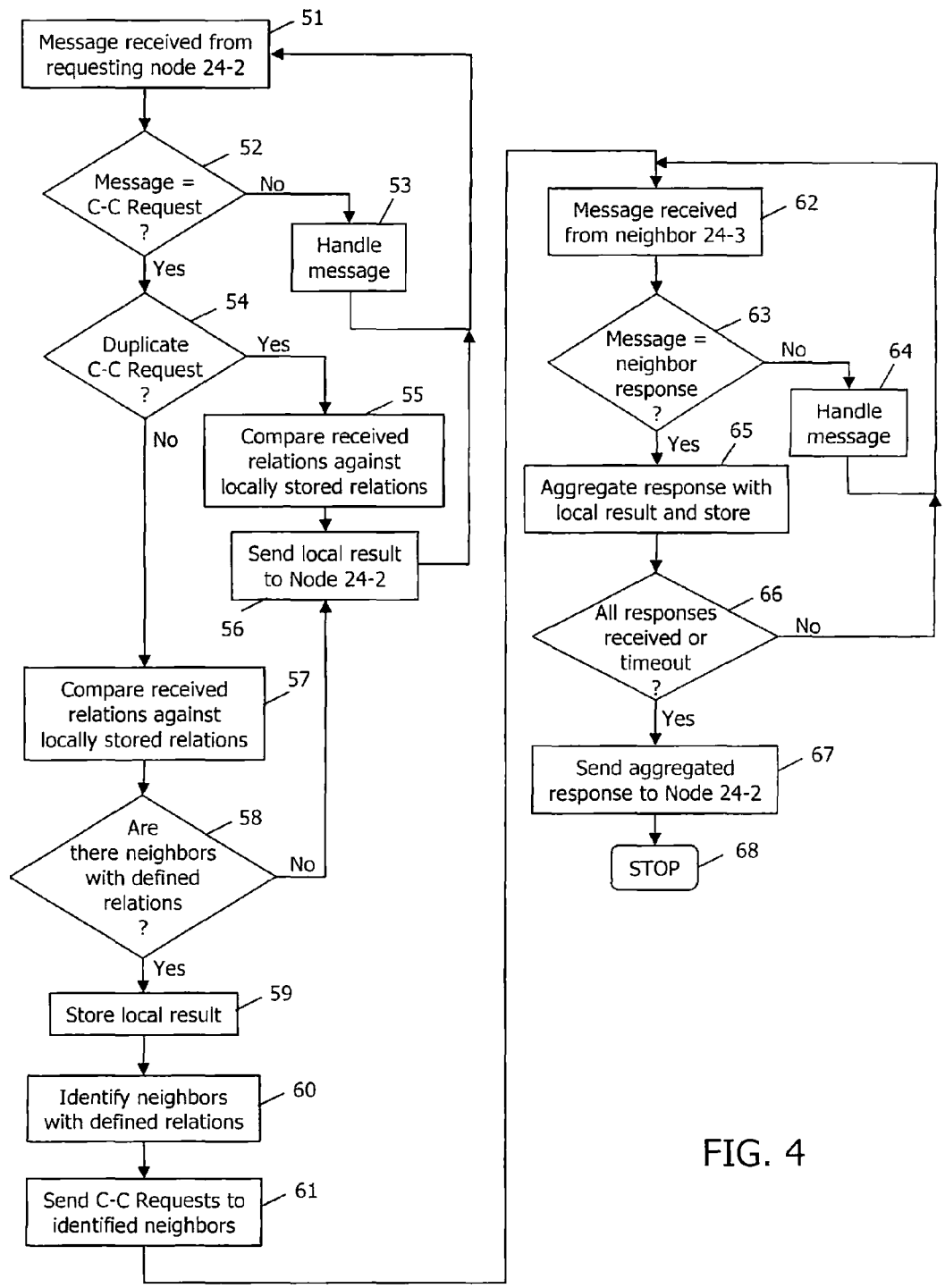
FIG. 4 is a flow chart illustrating the steps of an exemplary embodiment of the method of the present invention.

FIG. 4 is a flow chart illustrating the steps of an exemplary embodiment of the method of the present invention. At step 51, an application level message from a requesting node (for example node 24-2) is received in the network node 24-1. At step 52, it is determined whether the received message is a consistency-checking (C-C) request for checking the consistency of relationship information. If not, the network node handles the message per applicable procedures at step 53 and returns to step 51 to await further messages. However, if the received message is a C-C request, the method moves to step 54 where the network node determines whether the C-C request is a duplicate request. The duplicate request detector 33 detects whether the request relates to a consistency check that has already been processed (for example when there are cycles in the graph DG), and differentiates between different requests that may be traversing the network at the same time (as there may be multiple requests traversing the network, having been initiated from different network nodes). In one embodiment, the network node may differentiate between C-C requests by creating a different session for each different consistency check and propagating the session id together with the requests through the network.

If the request is a duplicate, the method moves to step 55, where the relationship information received from the requesting node 24-2 is compared with the relationship information stored in the network node 24-1 for that relationship. Note that if the request is received from the requesting node 24-2, then the C-C request includes the set of relationships defined on node 24-2 in relation to node 24-1. At step 56, network node 24-1 sends this local result to the requesting node 24-2, but does not forward the request to any further nodes. The method then returns to step 51 and continues to wait for messages.

If it is determined at step 54 that the request is not a duplicate, the method moves to step 57, where the relationship information received from the requesting node 24-2 is compared with the relationship information stored in the network node 24-1 for that relationship. At step 58, network node 24-1 determines whether there it has any further neighbors with defined relations. If not, the method returns to step 56, where network node 24-1 sends the local result to the requesting node 24-2, but does not forward the request to any further nodes. If network node 24-1 has further neighbors with defined relations, the method moves to step 59, where network node 24-1 temporarily stores the local result of the relationship consistency check in a data structure or memory 36. The comparison result may identify inconsistent information, or may indicate that all relationship information is consistent. This result represents only part of the response that network node 24-1 will generate. Node 24-1 will later aggregate the result with results received from downstream neighbors defined for network node 24-1, and will send an aggregated result back to the requesting node 24-2.

At step 60, network node 24-1 identifies a set N of neighboring nodes (N included in V, where V is the set of vertices in the graph DG, as defined above) for which relations are defined (i.e., nodes pointed to in the graph DG by outgoing arcs from network node 24-1). At step 61, the network node sends C-C requests to the identified neighboring nodes N requesting each such node 24-3 to check the relationship information and determine whether a symmetrical relation is defined on its side. The C-C request includes the set of relations defined on network node 24-1 for the neighbor 24-3, and requests the neighbor to compare its own relations against the set of relations included in the request. In order to prevent circular sending of messages through cycles in the graph DG, the C-C requests are sent only to neighboring nodes from which no request was received in the current session.

At step 62, network node 24-1 receives a message from neighboring node 24-3. At step 63, it is determined whether the received message is a response to the C-C request. If not, the network node handles the message per applicable procedures at step 64 and returns to step 62 to await further messages. However, if the received message is a response to the C-C request, the method moves to step 65 where network node 24-1 aggregates the result contained in the response with the local result stored in the memory 36, and stores an aggregated response. At step 66, the network node 24-1 determines whether responses have been received from all of the neighboring nodes in N to which C-C requests were sent, or if a timeout period has expired. If not, the method returns to step 62 where the network node 24-1 continues to await further response messages. If all responses have been received from all of the neighboring nodes in N to which C-C requests were sent, or the timeout period has expired, the method moves to step 67 where network node 24-1 sends the aggregated response to the requesting node 24-2. The method then ends at step 68.

Figure 5:
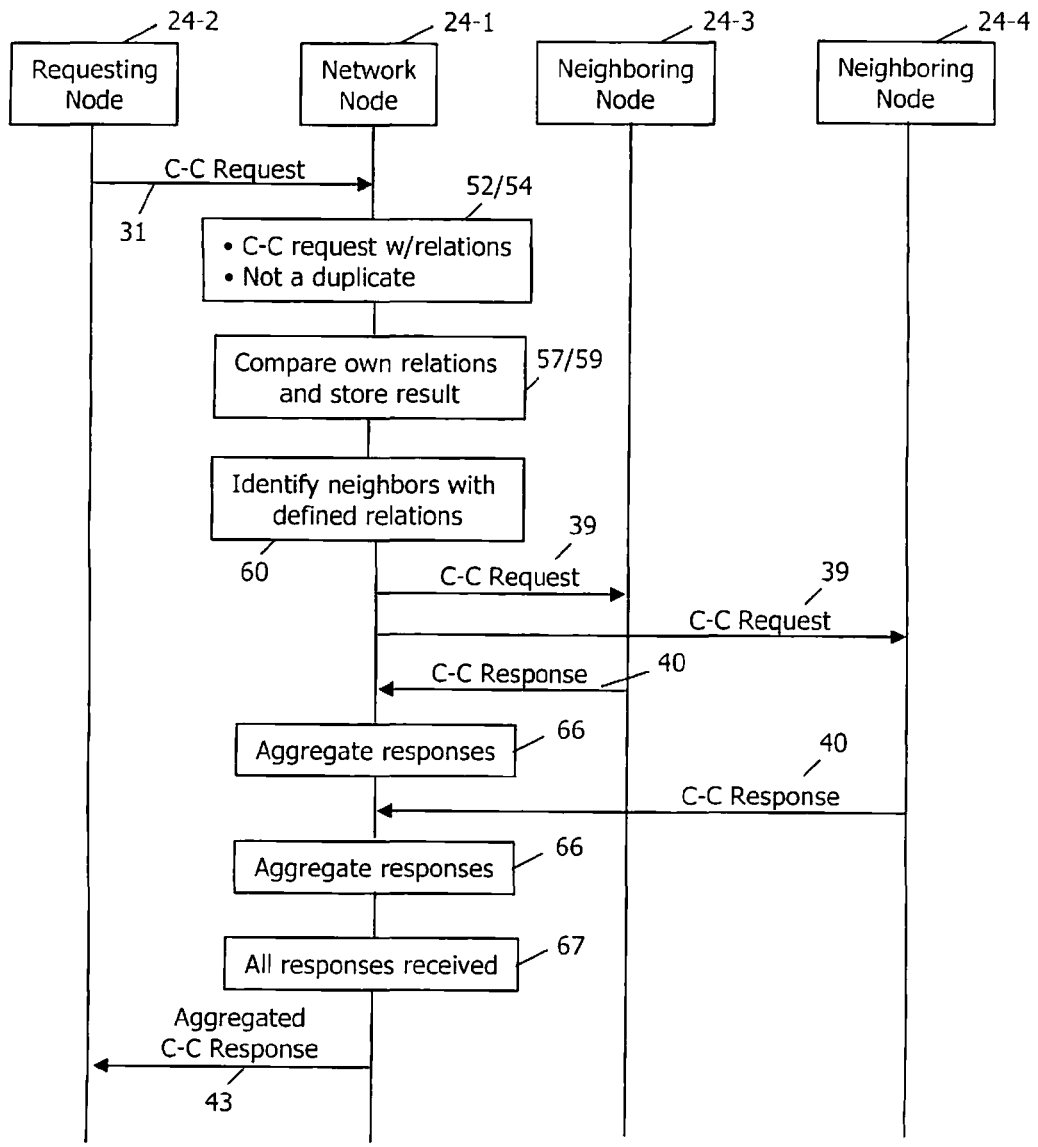
FIG. 5 is a signal flow diagram illustrating the flow of messages between network nodes in accordance with the teachings of the present invention.

FIG. 5 is a signal flow diagram illustrating the flow of messages between network nodes in accordance with the teachings of the present invention. Reference numbers in FIG. 5 refer to components shown in FIG. 3 and steps shown in FIG. 4. The requesting node 24-2 has a relationship defined with network node 24-1, while network node 24-1 has relationships defined with neighboring nodes 24-3 and 24-4. The requesting node 24-2 sends the C-C request to network node 24-1, which determines at 52/54 that the request is a C-C request having relationship information in the request to be checked, and the request is not a duplicate. At 57/59, network node 24-1 compares its own relationship information with the information received in the request, and stores the result. Network node 24-1 then sends C-C requests 39 to neighboring nodes 24-3 and 24-4, and includes its own relationship information (as defined for each neighboring node) in the request. The neighboring nodes perform a comparison and return their results in C-C responses 40. At 66, as each response is received, the network node 24-1 aggregates the received results from the received response together with its own stored local result to form an aggregated response comprising of all the results. At 67, the network node 24-1 determines that responses have been received from all of the neighboring nodes to which it sent a C-C request. The aggregated response 43 is then sent back to the requesting node 24-2.

FIG. 5 does not explicitly cover the case in which the graph DG contains cycles, but the algorithm as described above prevents messages from continuously cycling through the graph DG by a combination of: (a) keeping track of the different requests traversing the graph (i.e., duplicate message checking as shown in FIG. 5), and (b) keeping track of the different nodes from which the same request is received. Every node first checks whether it got a duplicate request. If the request is a duplicate, the receiving node checks the consistency of the relationship information with the originator node and immediately answers with this consistency-checking result without forwarding the request to further neighbors. For example, if network node 24-1 receives a request for the same consistency check from neighboring node 24-3, it responds to node 24-3 with a message that contains information about consistency of relations between node 24-1 and node 24-3, but it does not forward the request further to its neighboring nodes 24-2 and 24-4. If the request is not a duplicate, the receiving node checks the consistency of the relationship information with the originator node and also sends messages to its other neighbors and waits for their responses, before responding to the originator with the aggregated result.

There are two types of messages which may be exchanged in the procedure as described above: a C-C request message and a C-C response message. The C-C request message includes, but is not limited to:

(1) information elements indicating the type of message (i.e., request for consistency check);

(2) a sequential number to identify the request from other consistency check requests;

(3) the source node identity;

(4) the destination node identity; and (5) information on arcs defined on the originator's side (against which the network node receiving the request will check its own data).

The C-C response message includes, but is not limited to:

(1) information elements indicating the type of message (i.e., response for consistency check);

(2) a sequential number to identify the request from other consistency check requests;

(3) the source node identity;

(4) the destination node identity; and (5) information on the result of the consistency check (e.g., all data consistent, or a listing of inconsistencies detected).

In this manner, the present invention distributes the task of verifying the consistency of relationships between network nodes among all of the network nodes that have such relationships defined. When compared to the centralized solution offered by current generation Network Management Systems, the invention provides advantages in load distribution, guarantees of data consistency, and scalability. Each network node is made responsible for undertaking the checking of the consistency of the relationships in which it is involved, on request, and the results are aggregated along the graph until the originator of the request can form one response that identifies all inconsistencies found in the network. The present invention provides improved scalability, performance, and correctness of data than the centralized solution.

Although preferred embodiments of the present invention have been illustrated in the accompanying drawings and described in the foregoing Detailed Description, it is understood that the invention is not limited to the embodiments disclosed therein, but is defined by the following claims.

The invention claimed is:

1. A method of checking consistency of node relationship information in nodes of a strongly connected network, said method comprising the steps of:

receiving a consistency-checking request in a receiving network node, said consistency-checking request being received from an initiating network node and requesting the receiving node to check the consistency of node relationship information;

determining a local consistency-checking result of the consistency of node relationship information between the initiating node and the receiving node by comparing relationship information stored in the receiving node with relationship information received in the request;

if the receiving node does not have defined relations with any further nodes in the network, sending the local consistency-checking result from the receiving node to the initiating network node; and if the receiving node has defined relations with at least one further node in the network:

sending a further consistency-checking request to the at least one further node with which the receiving network node has a defined relationship;

receiving from the at least one further node, a consistency-checking response which includes a further consistency-checking result regarding the consistency of relationship information between the receiving node and the at least one further node;

aggregating the further consistency-checking result with the local consistency-checking result to form an aggregated result; and sending the aggregated result to the initiating network node.

2. The method as recited in claim 1, wherein the consistency-checking request received from the initiating node includes node relationship information stored in the initiating node regarding a defined relationship with the receiving node, and the step of determining a local consistency-checking result includes comparing the relationship information received in the request with relationship information stored in the receiving node regarding the defined relationship with the initiating node.

3. The method as recited in claim 2, wherein the further consistency-checking request sent to the at least one further node includes node relationship information stored in the receiving node regarding a defined relationship with the at least one further node, and the step of receiving a consistency-checking response from the at least one further node includes receiving a further consistency-checking result regarding the consistency of relationship information stored in the at least one further node and the relationship information sent in the further consistency-checking request.

4. A method of checking consistency of node relationship information in a plurality of nodes in a strongly connected network, said method comprising the steps of:

receiving in a first network node, a request sent from a second network node, said request including node relationship information from the second network node and requesting the first network node to check node relationship information stored in the first node for consistency with the node relationship information received from the second network node and with further neighboring nodes with which the first network node has defined relations;

determining whether the request received from the second network node is a duplicate request;

if the request received from the second network node is a duplicate request or if the first network node does not have defined relations with any further nodes in the network:
  determining a local consistency-checking result by comparing the first network node's node relationship information and the second network node's node relationship information; and
  sending the local consistency-checking result to the second node;
if the request received from the second network node is not a duplicate request and the first network node has defined relations with at least one further node in the network:
  determining the local consistency-checking result by comparing the first network node's node relationship information and the second network node's node relationship information;
  temporarily storing the local consistency-checking result in the first network node;
  identifying the at least one other network node with which the first network node has a defined relationship;
  sending a second request to the at least one further network node, said second request including node relationship information from the first network node relative to the at least one further network node and requesting the at least one further network node to check node relationship information stored therein for consistency with the node relationship information received from the first network node;
  receiving from the at least one further network node, a result of a comparison of the at least one further network node's node relationship information and the first network node's node relationship information;
  aggregating the result received from the at least one further network node with the temporarily stored result to create an aggregated result; and
  sending the aggregated result to the second network node.

5. A system for checking consistency of node relationship information in nodes of a strongly connected network, said system comprising:
  an initiating network node for initiating a request to check the consistency of node relationship information; and
  at least one receiving network node that receives the request, wherein each receiving node includes:
    a relationship information comparison unit for determining whether defined relationship information received from the initiating network node is symmetrically reflected by defined relationship information stored in the receiving network node;
    a neighbor ID unit for determining whether the receiving network node has defined relations with any further nodes in the network;
    a results aggregator/transmitter, responsive to a determination that the receiving network node does not have defined relations with any further nodes in the network, for sending to the initiating node, a response reporting whether the relationship information received from the initiating node is symmetrically reflected by relationship information stored in the receiving network node; and
    a consistency-checking request transmitter, responsive to a determination that the receiving network node has defined relations with at least one further node in the network, for sending a request to each further node to report whether defined relationship information stored in the further node symmetrically reflects defined relationship information included in the request from the receiving node, and wherein the results aggregator/transmitter is operable for sending to the initiating network node, an aggregated response reporting the consistency or inconsistency of all of the receiving network node's defined relationship information.

6. The system as recited in claim 5, wherein each receiving node also includes:
  a duplicate request detector for determining whether the request received from the initiating node is a duplicate request; and
  wherein the results aggregator/transmitter is responsive to a determination that the request received from the initiating node is a duplicate request, for sending to the initiating node, a response including only a determination of whether defined relationship information received from the initiating network node is symmetrically reflected by defined relationship information stored in the receiving network node.

7. A network node for checking consistency of node relationship information stored in a network node and other network nodes in a strongly connected network, said network node comprising:
  a consistency-checking request receiver for receiving from an initiating node, a request to check the consistency of node relationship information;
  a relationship information comparison unit for determining whether relationship information received from the initiating node is symmetrically reflected by relationship information stored in the network node;
  a neighbor ID unit for determining whether the network node has defined relations with any further nodes in the network;
  a results aggregator/transmitter, responsive to a determination that the network node does not have defined relations with any further nodes in the network, for sending to the initiating node, a response reporting whether the relationship information received from the initiating node is symmetrically reflected by relationship information stored in the network node; and
  a consistency-checking request transmitter, responsive to a determination that the receiving network node has defined relations with at least one further node in the network, for sending a request to each further node to report whether defined relationship information stored in the further node symmetrically reflects defined relationship information included in the request from the network node, and wherein the results aggregator/transmitter is operable for sending to the initiating network node, an aggregated response reporting the consistency or inconsistency of all of the network node's defined relationship information.

8. The network node as recited in claim 7, further comprising:
  a duplicate request detector for determining whether the request received from the initiating node is a duplicate request; and
  wherein the results aggregator/transmitter is responsive to a determination that the request received from the initiating node is a duplicate request, for sending to the initiating node, a response including only a determination of whether defined relationship information received from the initiating network node is symmetrically reflected by defined relationship information stored in the receiving network node.

* * * * *